C. LIDREN.
Wheel-Cultivator.
No. 46,116.
Patented Jan 31, 1865.
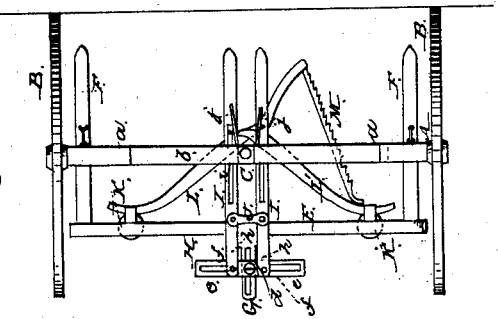
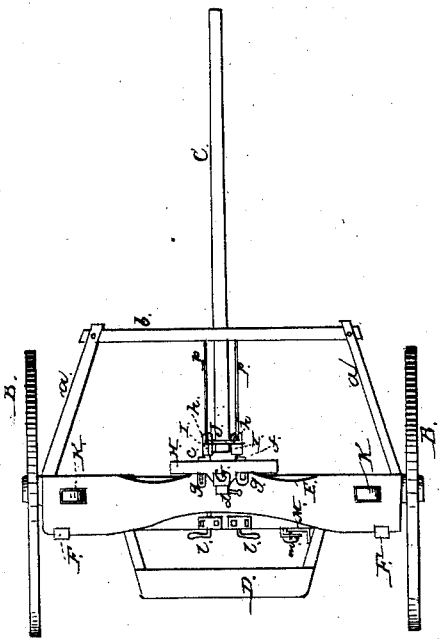
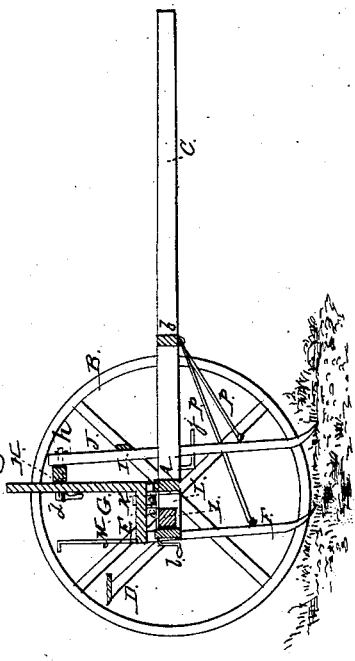
Inventor:
C. Lindren
per Munn & Co.
Attorneys

UNITED STATES PATENT OFFICE.

CHRISTOPHER LIDREN, OF AURORA, ILLINOIS.

IMPROVEMENT IN CULTIVATORS.

Specification forming part of Letters Patent No. 46,116, dated January 31, 1865.

*To all whom it may concern:*

Be it known that I, CHRISTOPHER LIDREN, of Aurora, in the county of Kane and State of Illinois, have invented a new and Improved Cultivator-Plow; and I do hereby declare that the following is a full, clear, and exact description thereof, which will enable those skilled in the art to make and use the same, reference being had to the accompanying drawings, forming part of this specification, in which—

Figure 1 is a plan or top view of my invention; Fig. 2, a back view of the same; Fig. 3, a side sectional view of the same, taken in the line $x\,x$, Fig. 1.

Similar letters of reference indicate corresponding parts.

This invention relates to a new and improved machine for plowing corn and other crops which are grown in hills or drills; and it consists in a novel construction and arrangement of the plows, as hereinafter fully shown and described, whereby the same are placed under the complete control of the operator, and a very simple and desirable machine obtained for the purpose specified.

A represents an axle; B B, the wheels of the same; and C, the draft-pole, attached centrally to the axle and braced by two oblique bars, $a\,a$, and a cross-piece, $b$. (Shown clearly in Fig. 1.)

To the rear of the axle A the driver's seat D is attached, and E is a bar which is placed directly over the axle A, and has two plow-standards, F F, attached to it, one near each end, the plows being at the lower ends of the standards, and the latter being fitted in notches at the rear of the axle, said notches serving as guides for the standards.

To the front side of the bar E, at its center, there is attached an upright, G, which is slotted vertically, and has a horizontal bar, H, secured to it by a bolt, $d$, the latter passing through the slot in the upright G and admitting of the bar H being adjusted higher or lower on the upright, as may be desired. The bar H has two oblong slots, $e\,e$, made in it to receive slides $f$, which are secured in said slots at any desired point by keys $g$, and these slides are provided at their front ends with journals $h$, on which the upper ends of plow-standards I I are fitted loosely, so that they may turn or swing thereon. The standards I I are connected by a bar, J, and each standard has a slot, $i$, made longitudinally in it to receive the ends of cranks $j$, which are on shafts $k$, the bearings of the latter being on the axle A. The rear ends of the shafts $k$ are all provided with cranks $l$, which are directly in front of the driver's seat D, so that they may be acted upon by the feet of the driver and the plows of the standards I I moved laterally or toward and from each other, so that they may conform to the sinuosities of the rows of plants. The other standards, F F, do not thus move, nor is it necessary that they should, for they simply pulverize the earth and eradicate weeds between the rows.

The bar E has two friction-rollers, K K, fitted in it, one near each end, and these rollers rest upon levers L L', which have their fulcra in the axle A, the latter having an oblong slot or opening in it to receive the levers. The lever L is longer than the other one, L', and extends down below the axle A, and is provided with a foot-piece, $m$. The lever L also has a pin, $n$, attached to it, which laps over the lever L'. By this arrangement it will be seen that the driver may at any time elevate all of the plows by simply pressing down on the foot-piece $m$ with his foot, which causes the levers L L' to raise the bar E, and the plows may be raised up entirely free from the ground, or they may be made to penetrate into the earth at a greater or less depth and retained at any desired point within the scope of their adjustment by means of a rack-bar, M, the lower end of which is pivoted to the foot-piece $m$ of lever L and passes up through a loop, $o$, at the back of the axle A. The standards I I and F F are braced by rods $p$ from the cross-piece $b$ of the bars $a\,a$.

Thus it will be seen that by this simple arrangement the driver has perfect control over the plows, and that the latter may be actuated with the greatest facility while the machine is in motion or is being drawn along.

Having thus described my invention, I claim as new and desire to secure by Letters Patent—

The rising and falling bar E, operated by the levers L L', and having the plow-standards I I permanently attached to it, as shown, in combination with the adjustable plow-standards F F, attached to said bar, as described, and operated by the crank-shafts $k$, all arranged substantially as and for the purpose set forth.

CHRISTOPHER LIDREN.

Witnesses:
 JOHN B. WHITE,
 HENRY A. SEARLES.